United States Patent [19]

Scarrott et al.

[11] 3,736,485

[45] May 29, 1973

[54] POSITIONING APPARATUS

[76] Inventors: Gordon George Scarrott, 34 Parkway, Welwyn Garden City; Brian John Steptoe, 24 Millard Way, Hitchin, both of England

[22] Filed: Jan. 18, 1971

[21] Appl. No.: 107,369

[30] Foreign Application Priority Data

Jan. 17, 1970 Great Britain........................2,358/70

[52] U.S. Cl....................................318/594, 318/603

[51] Int. Cl..............................................G05b 11/18

[58] Field of Search........................318/576, 594, 603

[56] References Cited

UNITED STATES PATENTS 3,414,785 12/1968 Orahood .............................318/594

3,105,963 10/1963 Stevens ................................318/576

3,458,786 7/1969 Thompson............................318/594

3,465,220 9/1969 Rabian .................................318/594

3,546,559 12/1970 Kosem..................................318/594

*Primary Examiner*—Bernard A. Gilheany

*Assistant Examiner*—Thomas Langer

*Attorney*—Hane, Baxley & Spiecens

[57] ABSTRACT

A servo system is shown applied to a transducer head. A count of pulses representing movement is subtracted from a digital required position representation giving an error signal. The velocity of movement is also calculated from said pulses and sampling pulses. A predetermined velocity function is formed with an accuracy that varies in a predetermined way as the head nears the required position. A comparator receives the error and function signals and controls a motor drive amplifier.

11 Claims, 1 Drawing Figure

Patented May 29, 1973 3,736,485
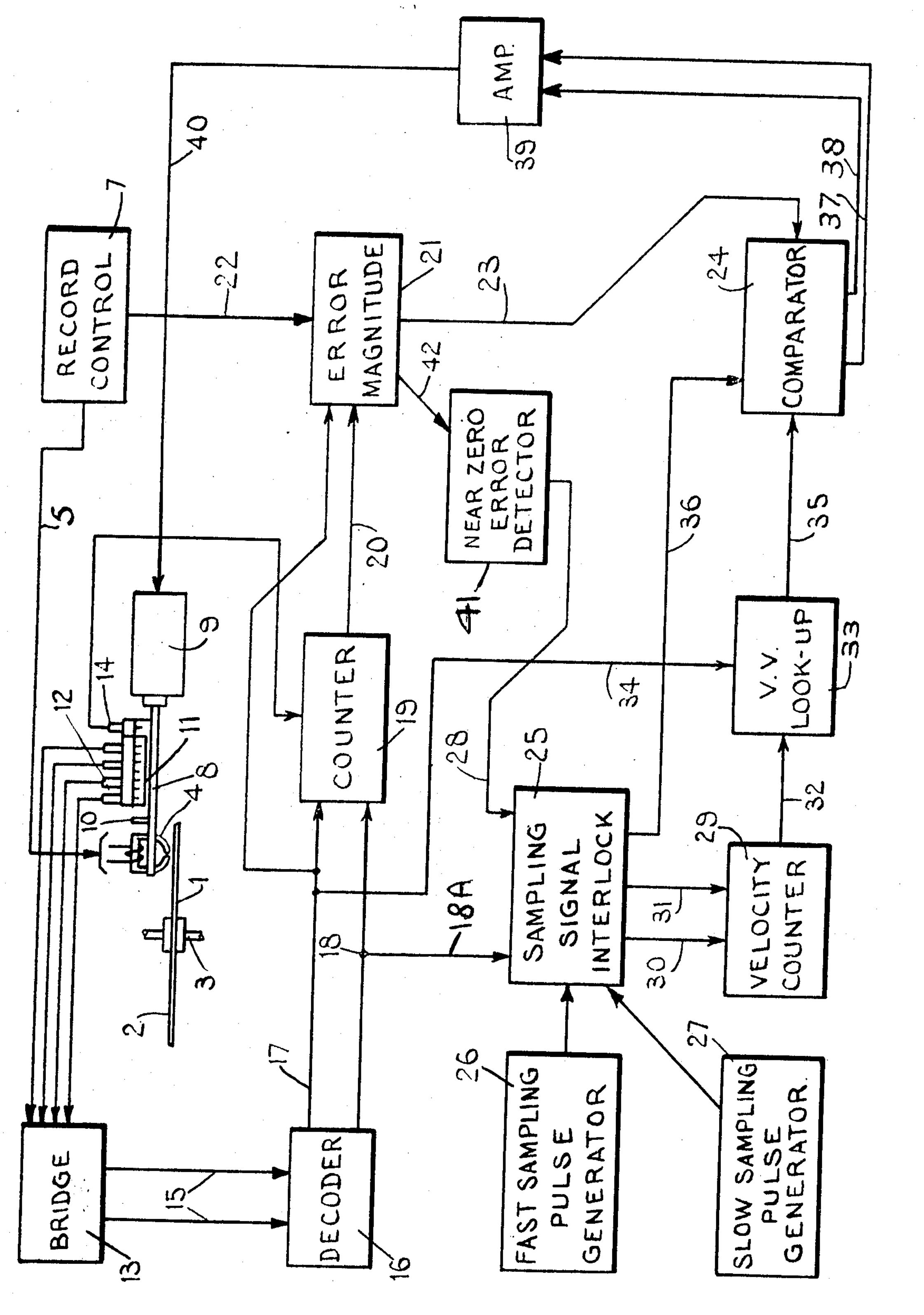

POSITIONING APPARATUS

The present invention relates to positioning apparatus in particular to servo-controlled apparatus for positioning an element in a required position in response to signals representing in the form of a digital error the distance by which the element is displaced from the required position.

SUMMARY OF THE INVENTION

According to the present invention, there is provided servo apparatus for positioning a driven element at a required position, comprising means for generating an error signal representative of the distance by which said element is currently displaced from said required position, means responsive to signals representing motion of said element to produce a second signal that approximates, with an accuracy that varies as said element nears said required position, to a predetermined function of the velocity of said element, and means responsive to said error signal and said second signal for providing a drive signal for said driven element. It is preferred for the error signal generating means and the second signal producing means both to be operative to give digital outputs.

BRIEF DESCRIPTION OF THE DRAWING

Apparatus embodying the present invention will now be described, by way of example, with reference to the accompanying drawing, which shows, in block schematic form, an arrangement for positioning a magnetic transducing head relative to a recording surface.

DESCRIPTION OF THE PREFERRED EMBODIMENT

Referring now to the drawing a magnetic recording arrangement includes a disc 1 having a magnetic recording surface mounted on a shaft 3, which, in operation, is rotated by a motor (not shown). A transducing head 4 is supported adjacent the surface 2 of the disc 1, so that as the disc is rotated the head 4 sweeps over a circular track on the surface 2. It will be appreciated that information may be recorded in the track by applying writing signals to the head 4, and that previously recorded information may be read from the track as it moves past the head 4, these writing and reading operations being performed in conventional manner over path 5 connecting the head 4 to a record control arrangement 7.

The head 4 is supported on an arm 8, and the arm 8 forms a projection from the coil of a moving coil motor 9. The motor 9 is arranged to produce, through the arm 8, radial movement of the head 4 with respect to the disc 1. Hence movement of the head 8 by the motor positions the head over different tracks on the surface 2 of the disc 1. It will be understood, therefore, that information may be recorded in a plurality of concentric tracks on the surface 2, and that a particular track may be selected for reading or writing operating by actuating the motor 9 to move the head 4 into position over the required track. In order to control this movement of the head 4, it will be appreciated that the tracks are numbered, and that the track numbering constitutes, for each track, a unique address.

Secured to the arm 8 is a screen 10 consisting of a transparent scale on which is ruled a plurality of equally spaced opaque lines. A fixed reference scale 11 is provided overlying the scale 10. The scale 11 is also in the form of a transparent member with opaque lines, so that as the scale 10 is moved by the arm 8 relative to the reference scale 11, a moire fringe pattern is produced in well-known manner. The pattern is scanned by a group of photo-electric cells 12 and signals from the cells 12 are applied to a bridge network 13. It will be appreciated that the scanning of the pattern produced by movement of the arm 8 produces a series of electrical pulses from the photocells 12. The use of the moire fringe pattern enables a considerable number of pulses to be generated in this way for a small movement of the transducer head 4, as from one track to another on the disc surface 2. Moreover, the use of a group of photocells 12, instead of only a single cell enables the direction of movement of the arm to be determined. A further photo electric cell 14 is also provided in association with the scale 10, and the arrangement of this cell is such that it produces an output signal when the head 4 is in particular predetermined position with respect to the disc 1. Hence, the signal produced by the cell 14 serves as a reference or datum signal.

It is preferred to use four photo-electric cells 12 to provide, in the bridge network 13, amplifiers for the output signals from these cells 12. The amplified signals are applied to a bridge circuit and outputs are derived from the bridge and are applied to Schmidt trigger circuits to produce a pair of output signals from the network 13. These signals consists of pulse trains in which the pulses indicate the passage of interference bands in the moire fringe pattern produced by the scales 10 and 11, and the pulse trains are out of phase with one another, one train leading the other if the movement of arm 8 is in one direction and lagging the other if movement is in the opposite direction. These output signals are applied over lines 15 to a decoder 16. The decoder 16 consists of a logic network which produces, in response to the signals, a first output over a line 17 which indicates the direction of movement of the arm 8, and a second output over a line 18 which is a pulse train. The pulses in this train correspond to increments of movement of the arm 8. In order to increase the accuracy with which the head 4 is positioned relative to a required track on the disc 1, it is preferred that the pulses in the train produced on the line 18 each represent only a fraction of the track spacing distance on the disc 1, for example, each pulse in the train may represent a head movement of, say, one thirty-second part of the track pitch.

The signals over lines 17 and 18 are passed to a reversible counter 19, which indicates at any time the actual position of the head 4 relative to the tracks on the disc 1. The counter 19 has a number of binary counting stages. In the present case, where the pulses on the line 18 represent increments of movement equal to one thirty-second part of the track pitch, the lowest denominations of the counter 19 are five in number to accumulate the increments of movement in passing between adjacent tracks, while the next higher denominations of the counter express the track addresses in binary code representation. Hence, if the head 4 is located at a track it will be realized that the five lowest denominations of the counter are all set to zero, while the higher denominations are set to represent the actual address of the track at which the head is located. The signal from the reference photocell 14 is applied to reset the counter 19, and this signal is generated when the head 4 moves to a position spaced one track pitch away from that track bearing the lowest address, namely track one. It will be understood that the counter 19 is conditioned in response to the signal on the line 17 to add or to subtract the pulses appearing on the line 18, in accordance with the direction of movement of the head 4 over the disc 1. Thus, while the head 4 is moving from a lower numbered to a higher numbered track the counter adds the pulses on line 18 and conversely, while the head movement is from a higher to a lower numbered track, the counter 19 is conditioned to subtract these pulses.

Outputs from the stages of the counter 19 are read in parallel over a group of lines 20 to an error magnitude detector 21. The detector also has a group of lines 22 connected to the record control arrangement 7. It will be understood that the address of the track to which the head is required to be moved is specified, for example in an address register, within the arrangement 7. The error magnitude detector 21 includes a binary subtractor having one more subtracting stage than there are counting stages in the counter 19. This additional stage is that of greatest binary code denominational significance and serves as a sign stage in conventional manner. The remaining stages of the subtractor are initially set by signals representing the required track address expressed in binary code from the record control arrangement 7 over the lines 22 and respond to the application of the signals from the counter 19 over the lines 20 to subtract the current head position indication from the required address to determine the magnitude of displacement of the head 4 from the required track.

It will be understood that if the head is required to move in the reverse direction, then the required address is numerically lower than the current head position represented by the outputs from the counter 19. In this case subtraction will produce a negative value. Hence the magnitude of displacement will be expressed in complementary form and the sign stage of the subtractor will be set to indicate that the value is negative. The detailed operation of the arrangement will be explained hereinafter. As will also be explained it is preferred to modify the calculation of the error magnitude when the head 4 is moving in the reverse direction, and a connection from line 17 to the detector 21 is provided to enable the direction of movement to be identified.

Signals representing the magnitude of head displacement, or error, produced by the detector 21 are passed over lines 23 to a comparator 24. The comparator also receives signals representing a function of the current head velocity, and these signals are derived in the following manner.

A sampling pulse interlocking network 25 is connected to two pulse generators 26 and 27, one generator 26 being arranged to generate a train of pulses at a slower rate, say of 10 kc./s., while the other generator 27 is arranged to generate a train of pulses at a faster rate, say 1 Mc/s. The interlocking network is arranged selectively to gate the pulses from the generators 26 and 27 in two ways. Firstly, the interlock selects the pulse train from either the generator 26 or 27 to be effective under control of a fast- or slow-sampling rate signal applied over a line 28. Secondly, a further gating arrangement is provided to prevent a pulse from the selected train occurring concurrently with a pulse derived from the decoder 16 and applied to the line 18.

To this end a path 18A is provided from the line 18, the occurrence of a pulse on the line 18A causing an inhibiting signal of predetermined duration. Thus, if a pulse occurs in the sampling train concurrently with a pulse on the line 18A from the decoder 16, the sampling train pulse is inhibited. The inhibition circuit includes a flip-flop which is set by the occurrence of the concurrent pulses and which resets after the predetermined interval to generate a signal that is, in effect, a delayed sampling pulse. Hence the sampling pulses from the interlock circuit 25 always occur between pulses from the decoder 16.

The pulses from the decoder 16, representing increments of head movement, and the sampling pulses are passed from the interlock network 25 to a velocity counter 29 over lines 30 and 31 respectively. The velocity counter 29 includes a number of binary counting stages and is arranged to count the number of movement increment pulses occurring on line 30 between successive sampling pulses. To this end the movement increment pulses on the line 30 are applied to the counter, while the sampling pulses are used to control the counter, the count being stopped by a sampling pulse to allow the total to be registered. The counter is then reset after a predetermined time delay before the occurrence of the next following movement increment pulse. The number of stages in the counter 29 is chosen to be sufficiently great to register the maximum number of increment representing pulses possible during a sampling period between a consecutive pair of sampling pulses at the slower rate.

At each sampling period the total registered by the velocity counter 29 is passed over a group of output lines 32 to a velocity squarer look-up network 33. The network 33 consists of an array of logic elements which are arranged to produce an output representing, in binary form, a quantity which may be regarded, for convenience, as the square of the total registered by the counter 29. The actual value produced by the network 33 is dependent upon the sign, or direction of movement of the head 4 over the disc, and a line 34 from the direction indicating line 17 of the decoder 16 is connected to the network 33. The value is further dependent upon the actual value of the total derived from the counter 29. The decimal equivalents of the binary coded values produced by the network 33 are set forth in the following table and it will be seen that for forward movement of the head 4 these values are true squares for totals less than 8 but are approximate only for totals in excess of 8. It is also to be noted that for convenience in dealing with the conditions in which the movement of the head 4 is in the reverse direction, it is preferred to modify by unity the values produced by the network 33 when this head movement takes place.

| Total from Counter 29 | Output from Network 33 Head Movement Forward | Output from Network 33 Head Movement In reverse | Total from Counter 29 | Output from Network 33 Head Movement Forward | Output from Network 33 Head Movement In reverse |
|---|---|---|---|---|---|
| 0 | 0 | 1 | 18 | 324 | 325 |
| 1 | 1 | 2 | 19 | 329 | 330 |
| 2 | 4 | 5 | 20 | 400 | 401 |
| 3 | 9 | 10 | 21 | 409 | 410 |
| 4 | 16 | 17 | 22 | 484 | 485 |
| 5 | 25 | 26 | 23 | 497 | 498 |
| 6 | 36 | 37 | 24 | 576 | 477 |
| 7 | 49 | 50 | 25 | 577 | 578 |
| 8 | 64 | 65 | 26 | 708 | 709 |
| 9 | 65 | 66 | 27 | 713 | 714 |
| 10 | 132 | 133 | 28 | 784 | 785 |
| 11 | 137 | 138 | 29 | 793 | 794 |

| | | | | | |
|---|---|---|---|---|---|
| 12 | 144 | 145 | 30 | 928 | 929 |
| 13 | 153 | 154 | 31 | 941 | 942 |
| 14 | 228 | 229 | 32 | 1024 | 1025 |
| 15 | 241 | 242 | 33 | 1025 | 1026 |
| 16 | 256 | 257 | 34 | 1028 | 1029 |
| 17 | 257 | 258 | 35 | 1033 | 1034 |

In addition to the binary code components representing the square the output from the velocity squarer 33 includes a bit (the most significant bit) which indicates sign of required movement and which is derived from the signal applied to the network 33 over the line 34. The outputs from the network 33 are applied over a line 35 to the comparator 24. The comparator 24 also receives a sampling signal over a line 36 from the sampling signal interlock 25, and contains a series of logic comparison networks, one for each binary denomination of the error and square values. These comparison networks are arranged in cascade so that comparison is effected from the most significant bits to the least significant. At each step of the cascade an output is derived if the error bit is greater than the corresponding square bit, whereas if the corresponding bits are equal the comparison is passed along to the network of next lower denominational significance. Thus, the "error greater" signal may be derived from any stage of the comparison, and an "equal" signal may be derived from the last stage of the comparison if both values are equal. These two signals are applied to control a flip-flop within the comparator 24. The flip-flop is triggered by the sampling signal from the line 36, and if the "error greater" signal is present the flip-flop is set; if neither the "error greater" nor the "equal" signal is present the flip-flop is unset; while if the "equal" signal is present triggering is inhibited so that the flip-flop remains in its previous state. If the flip-flop is set an "accelerate forward" signal is generated and passed over a line 37. If the flip-flop is unset an "accelerate reverse" signal is generated and passed over a line 38.

The lines 37 and 38 are connected to a bipolar amplifier 39 which produces an output on a line 40 to drive the motor 9 in the forward or reverse direction in dependence upon which of the lines 37 or 38 is carrying the signal from the comparator.

As the head 4 is moved by the motor 9 to the required new track position it will be apparent that the magnitude of the positional error decreases. The precise positioning of the head at the new track may be improved, and overshoot minimized, by the provision of a "near zero" detector 41. The detector 41 includes a logic network fed by signals from the error magnitude detector 21 over lines 42. This gating network is arranged to detect the approach of the head 4 to the required track by detecting the occurrence of an error having a magnitude of, say 8 increments of head movement or less, the detection of this error causing a flip-flop to be set. The setting of this flip-flop produces a signal on the line 28 connected to the sampling signal interlock network 25, and the network 25 responds to the signal on line 28 to inhibit the sampling pulses from the slow pulse generator 27 and to render effective pulses from the fast pulse generator 26 as sampling pulses. This permits the comparison of the error with the velocity function value to be performed at shorter intervals and thus enables the deceleration of the head movement to be better matched to the actual positional error as the head 4 approaches the required track.

The control of head movement may be further improved if the velocity function value is modified during this period, and to this end a connection may be made from the line 28 to the velocity squarer look-up network 33. A logic circuit in the network 33 may then be arranged to modify the lowest output values from the network, for example, as shown in the following table:

| Total from counter **29** | Output from Network 33 Head movement Forward | In reverse |
|---|---|---|
| 0 | 0 | 1 |
| 1 | 3 | 4 |
| 2 | 6 | 7 |
| 3 | 11 | 12 |

The substitution of these values has the effect that deceleration of the head movement occurs slightly earlier than would otherwise be the case.

To illustrate the operation of the arrangement, it is assumed that the head 4 is initially positioned at a first track and is required to be moved in a forward direction to a second track. The address of the second track is specified in the record control arrangement 7, and this address is applied to the error magnitude detector 21. The address of the track at which the head 4 is currently positioned will be indicated by the most significant denominations of the counter 19, as previously noted. The error magnitude detector 21 therefore produces an output over the lines 23 which represents the total number of movement increments by which the head 4 is required to be moved. Because, at this stage there is no movement of the head 4, there is no signal on the line 17 to indicate current direction of movement. However, because the address of the required track is greater than the address of the track at which the head 4 is currently located the subtraction of current address from required address produces a positive difference, and the sign unit of the error is therefore made positive.

The error so calculated is applied over lines 23 to the comparator 24. Because there is no head movement there is no total in the velocity counter and the output from the squaring network 33 is zero. Thus, the comparator 24 indicates "error greater" and its flip-flop is set by the next sampling pulse over the line 36. This produces the required "accelerate forward" signal on the line 37 and the amplifier 39 energizes the motor 9 to move the head 4 in the forward direction.

Consideration of the requirements of head movement shows that in an ideal case the head 4 is accelerated away from the initial track and the acceleration continues to a point between the initial and required tracks, at which point the head 4 is decelerated so that it finally comes to rest on the required track without overshooting. Using the present system of driving in which the motor 9 is energized by a predetermined current which may be applied in either direction it is seen that the application of this current in the forward direction will produce an acceleration of the motor 9 in the required direction, the subsequent application of the current in the reverse direction producing deceleration until the motor 9 is brought to rest. Continued application of the current in the reverse direction would then produce an acceleration of the motor 9 in the opposite direction so that in the ideal case the application of current to the motor is to be controlled so that the combination of forward and reverse currents applied to the motor just bring the motor 9 to rest as the head 4 reaches the require track and at this point to cease energizing the motor 9.

It is found that a close approach to the ideal case is obtained by sampling the conditions of the system at intervals to find the sign of the function *E-kv v* , where *e* is the error magnitude, *k* is a constant that depends on the characteristics of the motor 9 of the sampling interval and *v* is the velocity measured by a count of the increments of movement in a sampling period. The expression *v v* is numerically equivalent to the square of the velocity but has the sign of *v* itself. By a suitable choice of motor characteristics sampling interval and movement increments per track pitch it is possible to arrive at a value for *k* which simplifies the operation of the apparatus. For example, in the present case it will be recalled that the velocity counter 29 registers the number of movement increments within a sampling period, and the number of increments in a track pitch is chosen to be 32. Thus the square of the velocity or *v v* , would numerically represented as a digital value in units of 1/32 × 1/32 of track pitch. By making 32 a factor of *k* then, the product *kv v* is expressed as a numerical value that can be compared with 1/32 of track pitch. In other word the squarer network 33 output value is directly compatible with the error magnitude from the detector 21, which is also expressed in 1/32 nds of track pitch.

It will therefore be apparent that once the motor 9 has been energized to drive the head 4 in the forward direction the velocity counter 29 will produce in each sampling period a count representing current velocity, and the squaring network 33 will produce an output having a numerical value dependent upon the current velocity and having a sign that is positive (or forward-movement-indicating). At the same time the error magnitude detector 21 continues to produce signals representing the magnitude of the head movement yet required in the forward direction. Thus, while the error at any sampling period continues to exceed the output from network 33 the comparator 24 continues to register an "error greater" condition and the energization in a forward direction of the motor 9 combines, to produce the required forward acceleration of head movement.

If, at some point in the movement of the head, the error represented by the signals from the detector 21 is equal to the output from the network 33 the comparator 24 registers an "equal" condition and the forward energization of the motor 9 is continued, for it will be recalled that the "equal" condition maintains the output from the comparator 24 unchanged whatever its state.

At some point in the head movement the error will have decreased and the velocity will have increased so that the comparator 24 registers neither the "error greater" condition nor the "equal" condition and at this point the output control flip-flop of the comparator 24 is unset and an "accelerate reverse" signal is applied to the amplifier 39 over the line 38. The occurrence of this signal causes the motor 9 to be energized in the reverse direction, thus producing deceleration of head movement.

It will be seen, therefore, that the result of comparing the output from the velocity squarer network 33 (which actually produces signals having a numerical significance approximately equal to the square of the velocity multiplied by the constant *k*) with the current error in head position enables the acceleration and deceleration of the head motor 9 to be controlled to bring the head 4 to rest at the required track.

The actual values of the network 33 output are modified from the true square values in two ways. Firstly, if the distance through which the head is to be moved is large, then it follows that the motor 9 will accelerate the head 4 to a greater velocity than would be the case for a small movement. Since the motor 4 is actually energized in either direction by a single value of current it will be appreciated that for the higher velocities it is sufficient that the output of the network 33 is in practice only approximately the square of the velocity counter 29 output. Thus, the output from the network 33 relative to the error magnitude needs to be less accurately determined for the greater values of error magnitude. Secondly, in practice, the values assigned to the network 33 output may be changed from the true square values for small distances of movement to allow earlier deceleration, as previously described. It will be clear that such changes are dependent upon the response characteristics of the head motion mechanism. Thus, for example, in driving a head mechanism which has a high damping characteristic it may alternatively be required to delay deceleration.

It will be apparent that the sequence of events described in moving the head 4 in a forward direction are also followed to move the head in a reverse direction. In this case, however, the comparator 24 initially produces an "accelerate reverse" signal because the current head position indication produced by the counter 19 is greater than the required address, and subtracting therefore produces a negative difference. Hence, the error magnitude is a negative quantity and is thus less than zero, which is the numerical value of the output of the network 33 while the head is stationery. When the head 4 begins to move the sign bit produced by the decoder 16 on line 17 indicates that movement is in reverse, and the output from the network 33 is accordingly indicated as a negative value. Hence in the comparator 24 both sign bits are negative and are therefore treated as equal so that the determination of the output signal generation is dependent upon the values of the lower binary denominations in the comparator 24. This determination may be illustrated by an example. Suppose that the error magnitude registered by the detector 21 is −6. This value is expressed in complement as the inverse of the binary code representation of one less than the actual magnitude. Thus, if the error registered is −6, (binary equivalent −00110) the complement is, neglecting the sign, the inverse of 5 (binary equivalent 00101) namely, 11010. The expression of the kv *v* value from the network 33 is presented in inverted form and is signed as negative in response to the signal from the line 17 of the decoder 16. Thus, if the output from network 33 represents −2 (binary equivalent, neglecting the sign: 00010) the value registered will be 11101, which is greater than the error registered. Hence in this case the error is less than the kv *v* value and an "accelerate reverse" signal is generated over line 38 to maintain acceleration of the motor 9 in the reverse direction. On the other hand suppose that the output from the network 33 represents −9 (binary equivalent, neglecting the sign: 01001), the value registered will be 10110 which is less than the error registered, so that in this case the comparator generates an "accelerate forward" signal on line 37 and the effect of this signal is to energize the motor 9 in the forward direction to apply deceleration to the head motion.

In order better to control the actuation of the motor at the point where it encounters the required track the error generator 21 actually contains an additional logic network which responds to the indication of direction of motion over line 17 to modify the error values actually passed to the comparator. Thus if motion is in the forward direction and the error indicated is zero, unity is subtracted so that the error value registered in the comparator is −1. In this way there is a rapid change from a complementary value to a positive value at the required track address. It is also preferred for convenience of operation that if the motion is in the reverse direction and the error indicated is not +1, unity is subtracted from the error true value. This means that while the head is approaching the required track the error value registered is always one less than it should be and allows the kv $v$ value from the network 33 merely to be inverted and not complemented as it should otherwise be and also allows a rapid change from a value of −1 to +1 at the required track. These rapid changes have been found to produce better head settling characteristics at the required track.

We have described a servo system in which coarse positioning and fine positioning is done differently, namely using the sampling pulses from generator 27 or generator 28. In both cases digital operations are involved. It is, however, envisaged that, if desired, several digital communication channels (as many as one per digit required for the fine positioning) can be saved and less refined digital equipment utilized, by utilizing an analog operative stage for the fine positioning.

We claim:

1. Servo apparatus for positioning a driven element at a required position comprising; means for positionally adjusting the element; means for producing signals representative of the current position of the element; means for generating from the position signals and a signal characteristic of the required position an error signal representative of the distance by which the element is currently displaced from the required position; means responsive to signals representing motion of said element to produce second signals approximately to a predetermined function of the velocity of the element with an accuracy that varies as the element approaches the required position; and means for comparing the error and second signals for providing a control signal for controlling operation of the element adjusting means.

2. Apparatus according to claim 1, wherein the means for generating the error signal comprises a subtractor having a digital signal output, the subtractor serving to subtract a digital signal representation of the current position of said element from a digital representation of said required position, and to provide its digital output in complementary form whenever the current position digital signal representation is higher than the required position digital representation.

3. Apparatus according to claim 2, wherein the means for producing signals representative of said current position comprises; means for providing a pulse each time the position of said element changes by a predetermined amount and a sign signal whose polarity indicates the sense of such change in a particular direction through said required position; a reversible counter connected to count the pulse in a direction determined by the sign signal and to provide as output said digital representation of the current position of said element; and control means for providing said digital representation of said required position.

4. Apparatus according to claim 3, wherein the means for producing the second signal comprises a further counter operative, for coarse positioning of said element, to count the number of said pulses that occur within a first predetermined time duration, and wherein the further counter is alternatively operative, for fine positioning of said element, to count the number of pulses that occur within another shorter predetermined time duration when said element gets within a predetermined distance of said required position.

5. Apparatus according to claim 4, and comprising pulse generator means for providing a train of first sampling pulses at intervals equal to said first predetermined time duration, the further counter being reset by each said sampling pulse.

6. Apparatus according to claim 5, and comprising further pulse generator means for providing a train of further sampling pulses at intervals equal to said second predetermined time duration, and pulse gating means for substituting said further sampling pulses for the first sampling pulses as input to the further counter in response to an output from means for detecting that said element is within said predetermined distance.

7. Apparatus according to claim 3, wherein the means for providing the second digital signal comprises squaring means operative on a third digital signal to provide a function of the square of the velocity of said element and an indication of the direction of movement of said element.

8. Apparatus according to claim 7, wherein the squaring means is a look-up logic network for providing squaring of lower values of the third digital signal generally more accurately than squares of higher values thereof.

9. Apparatus according to claim 8, in which once said element is within said predetermined distance of said required position, the look-up logic network is operative to produce modified values for said square of the lowest values of the third digital to provide for earlier deceleration of said element.

10. Apparatus according to claim 7, wherein the squaring means is operative when the current element position digital presentation is higher than the required element position digital representation to provide values having a preset difference from the values provided when the current position digital representation is lower than the required position digital representation.

11. Magnetic recording apparatus having a transducer head movable between positions corresponding to individual information tracks, and comprising servo apparatus according to claim 1 for which the transducing head constitutes said element.

* * * * *